(12) United States Patent  (10) Patent No.: US 8,333,579 B2
Borgatti et al.  (45) Date of Patent: Dec. 18, 2012

(54) APPARATUS AND A METHOD FOR MAKING PLASTIC CONTAINERS BY BLOW-MOULDING PARISONS

(75) Inventors: Maurizio Borgatti, Imola (IT); Paolo Dalle Vacche, Sant'Agata sul Santerno (IT); Massimo Morovingi, Imola (IT); Fiorenzo Parrinello, Medicina (IT); Emilio Re, Ancona (IT); Gabriele Stocchi, Parma (IT); Andrea Zanardi, Felino (IT)

(73) Assignee: SACMI Cooperativa Meccanici Imola Societa' Cooperativa, Imola (IT)

( * ) Notice: Subject to any disclaimer, the term of this patent is extended or adjusted under 35 U.S.C. 154(b) by 343 days.

(21) Appl. No.: 12/878,576

(22) Filed: Sep. 9, 2010

(65) Prior Publication Data

US 2011/0064839 A1    Mar. 17, 2011

(30) Foreign Application Priority Data

Sep. 14, 2009  (IT) .............................. BO2009A0581

(51) Int. Cl.
*B29C 49/58* (2006.01)
(52) U.S. Cl. ........................... 425/182; 29/428; 425/535
(58) Field of Classification Search .................. 425/182, 425/535, 536; 29/428
See application file for complete search history.

(56) References Cited

U.S. PATENT DOCUMENTS

| 3,513,502 A | 5/1970 | Chambers |
| 6,238,200 B1 | 5/2001 | Spoetzl |
| 8,137,091 B2 * | 3/2012 | Fleischmann et al. ........ 425/182 |

FOREIGN PATENT DOCUMENTS

| DE | 198 46 594 A1 | 4/2000 |
| EP | 0 265 713 A2 | 5/1988 |

* cited by examiner

*Primary Examiner* — Robert B Davis
(74) *Attorney, Agent, or Firm* — Pearne & Gordon LLP

(57) ABSTRACT

An apparatus (1) for making plastic containers by blow-molding parisons comprises: a mold (2) having at least one molding cavity; a base (3) mounted over the mold (2), forming at least one passage (4) connected to a high-pressure fluid source; a blow nozzle (7) forming at least one conduit and connected to a bottom face (5) of the base (3) to be positioned between the base (3) and the mold (2) in such a way that the conduit is in fluid communication with the passage (4) to receive the high-pressure fluid and convey it into the molding cavity; fastening means for coupling and uncoupling the blow nozzle (7) to and from the base (3); at least one pin (10) protruding from the nozzle (7) to be inserted into a respective through hole in the base (3) with an end portion (12) of it positioned above a top face (6) of the base (3); a fastening element (13) connected to the base (3) to be movable from an unlocked position, where it does not interfere with the pin (10), to a locked position where it is inserted in an end groove (14) defined by the end portion (12) of the pin (10), and vice versa.

14 Claims, 7 Drawing Sheets

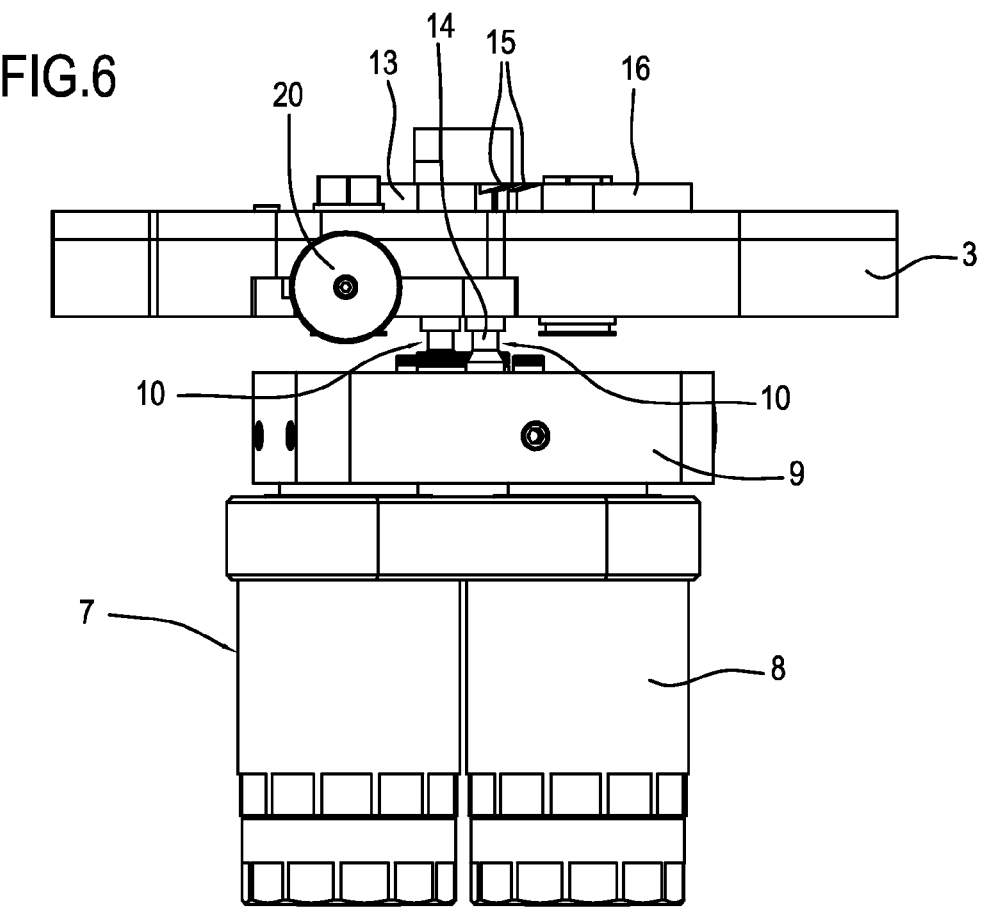
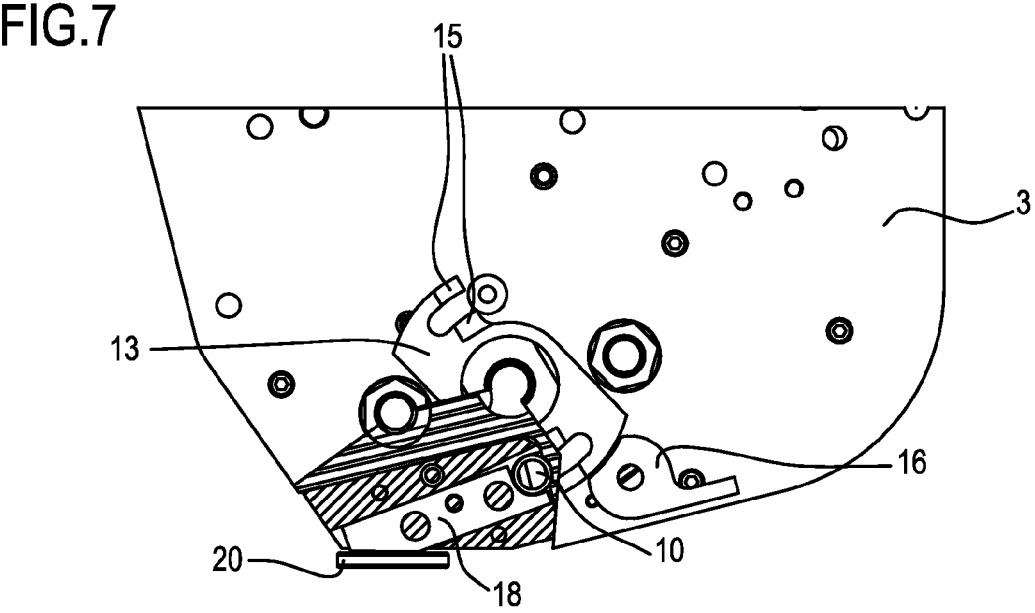

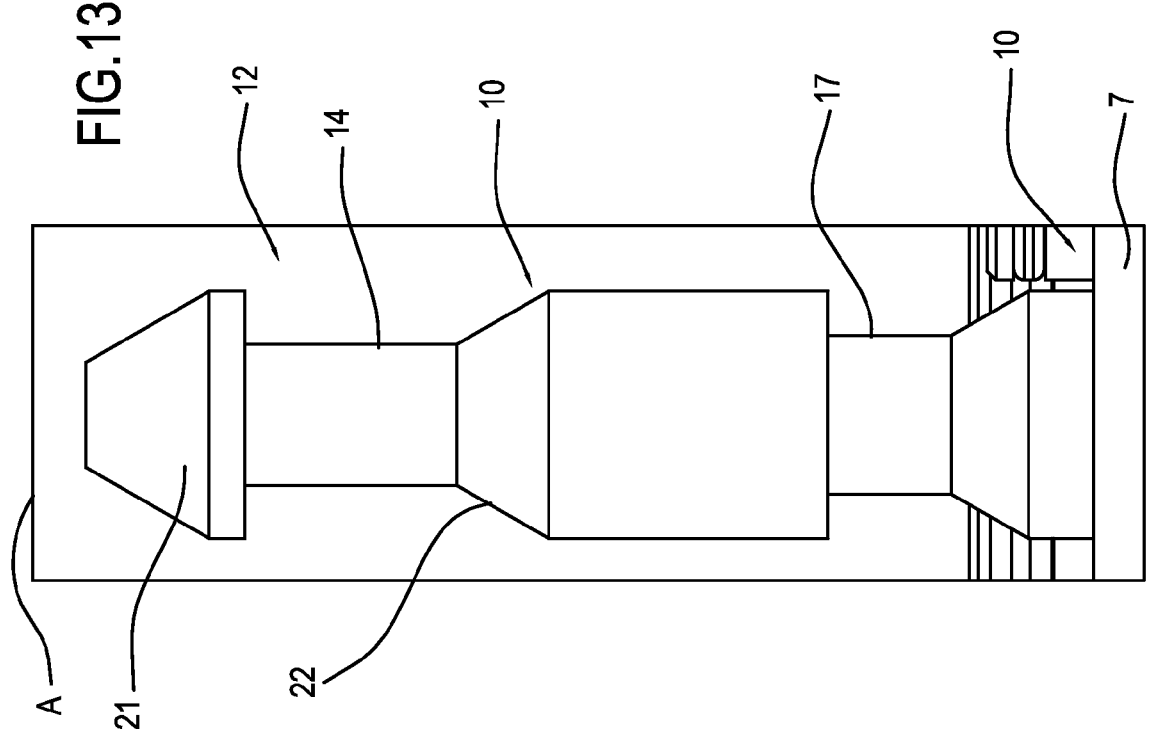
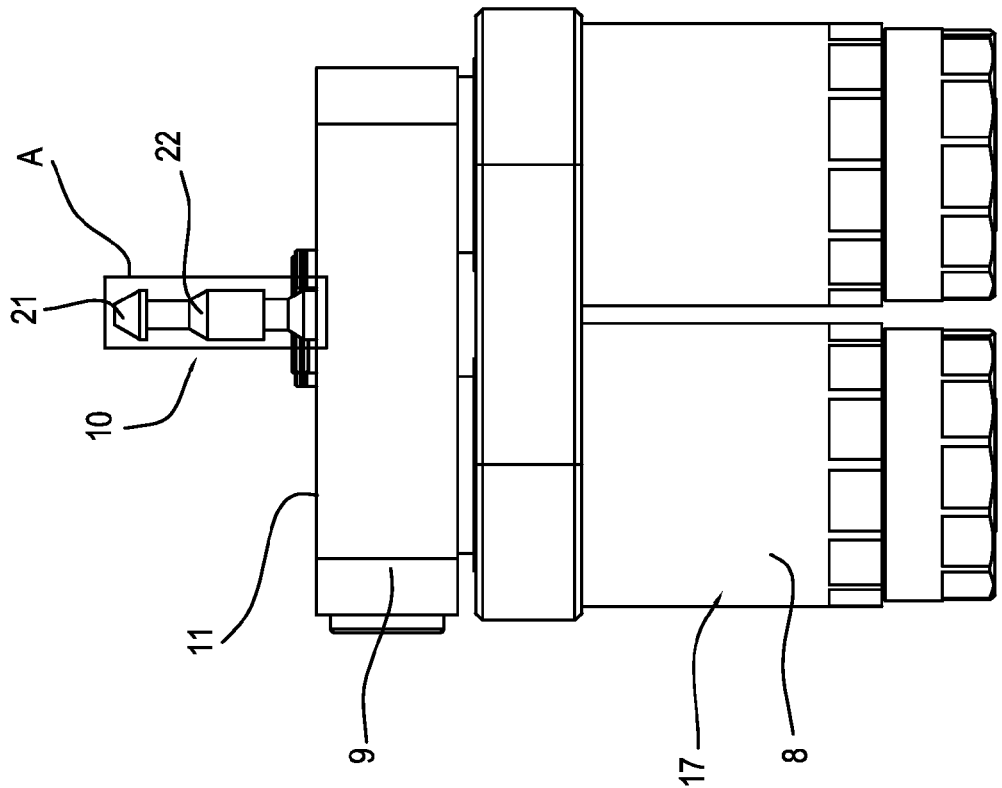

APPARATUS AND A METHOD FOR MAKING PLASTIC CONTAINERS BY BLOW-MOULDING PARISONS

FIELD OF THE INVENTION

This invention relates to an apparatus and a method for making plastic containers by blow-moulding parisons.

BACKGROUND OF THE INVENTION

In the context of plastic container production, in particular the production of plastic bottles, the use of blow-moulding machines is known.

A blow-moulding machine comprises a plurality of moulding units or apparatuses for moulding the containers.

Generally speaking, a moulding unit comprises:
a mould having at least one moulding cavity;
a base mounted over the mould, forming at least one passage connected to a high-pressure fluid source;
a blow nozzle forming at least one conduit and connected to a bottom face of the base to be positioned between the base and the mould in such a way that the conduit is in fluid communication with the passage to receive the high-pressure fluid and convey it into the moulding cavity;
fastening means for coupling and uncoupling the blow nozzle to and from the base.

In this context, there is a need to use the machine to make containers of different types and sizes.

Adapting the moulding unit (or the blow-moulding machine) to the production of containers of different sizes is known as changeover.

Changeover involves substituting the mould with another one having a different number of moulding cavities and substituting the blow nozzle with another nozzle having a corresponding number of conduits.

That means uncoupling all the blow nozzles and fitting other nozzles.

In prior art systems, this is a time-consuming and difficult procedure. The nozzles are fastened with a large number of screws and bolts which must be screwed off to remove the nozzles and then on again to fit the nozzles suitable for the required size.

This creates considerable inconvenience and raises machine operating costs.

SUMMARY OF THE INVENTION

This invention has for an aim to provide an apparatus and a method that overcome the above mentioned drawbacks of the prior art.

In particular, the invention has for an aim to provide an apparatus for moulding containers and a method for coupling and uncoupling a blow nozzle to and from a base, in a container moulding apparatus, that allow changeover to be performed extremely quickly and easily.

These aims are fully achieved by the apparatus and method according to the invention as characterized in the appended claims.

BRIEF DESCRIPTION OF THE DRAWINGS

These and other characteristics of the invention will become more apparent from the following detailed description of a preferred, non-limiting embodiment of it, with reference to the accompanying drawings, in which:

FIG. 6 is a front view of the portion of FIG. 4;
FIG. 7 illustrates the portion of FIG. 6 in a cross section through a horizontal plane;
FIG. 12 is a front view of the blow nozzle;
FIG. 13 illustrates an enlargement of the detail A from FIG. 12.

DESCRIPTION OF THE PREFERRED EMBODIMENTS

Figure 1:
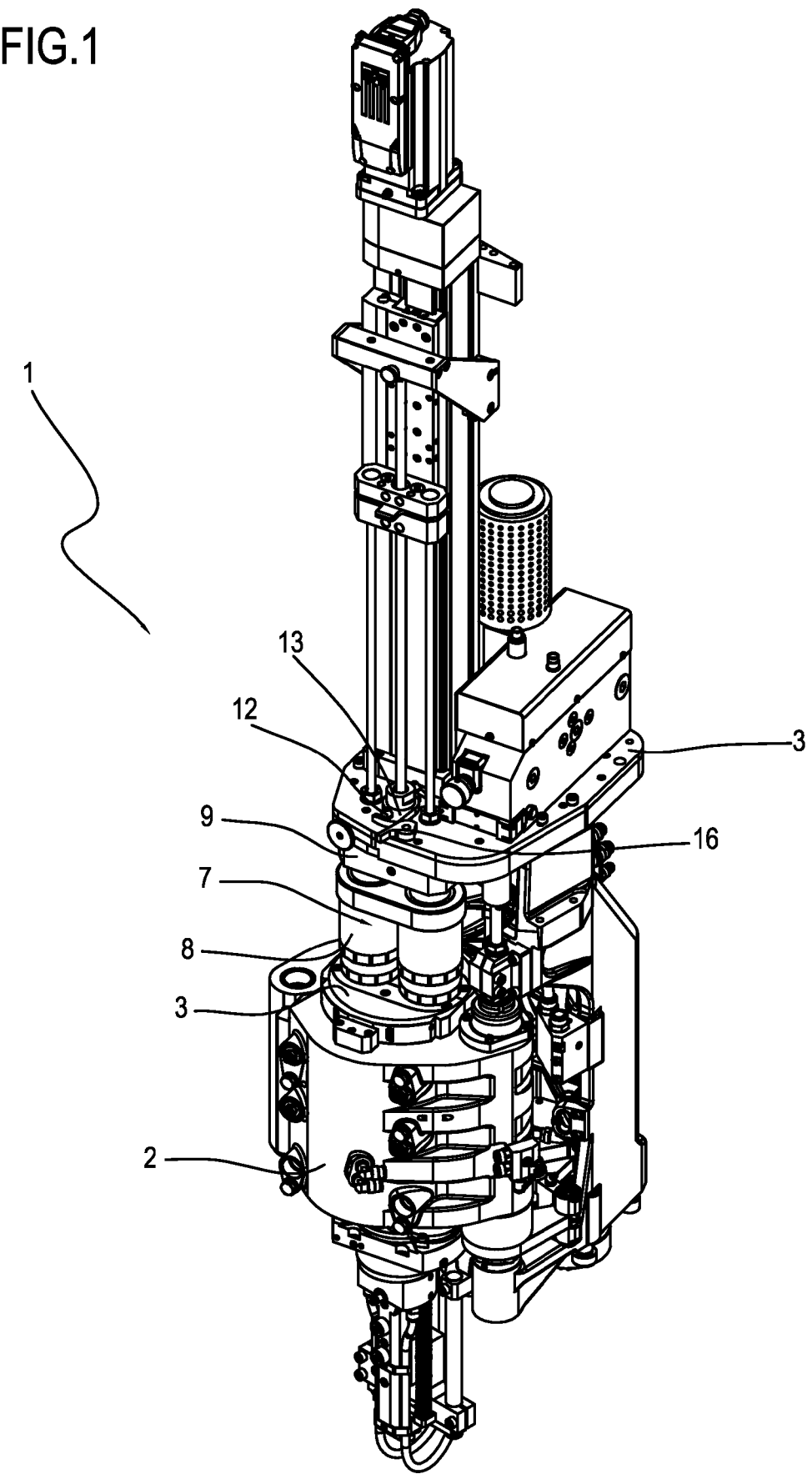
FIG. 1 is a perspective view of an apparatus according to the invention.
Figure 2:
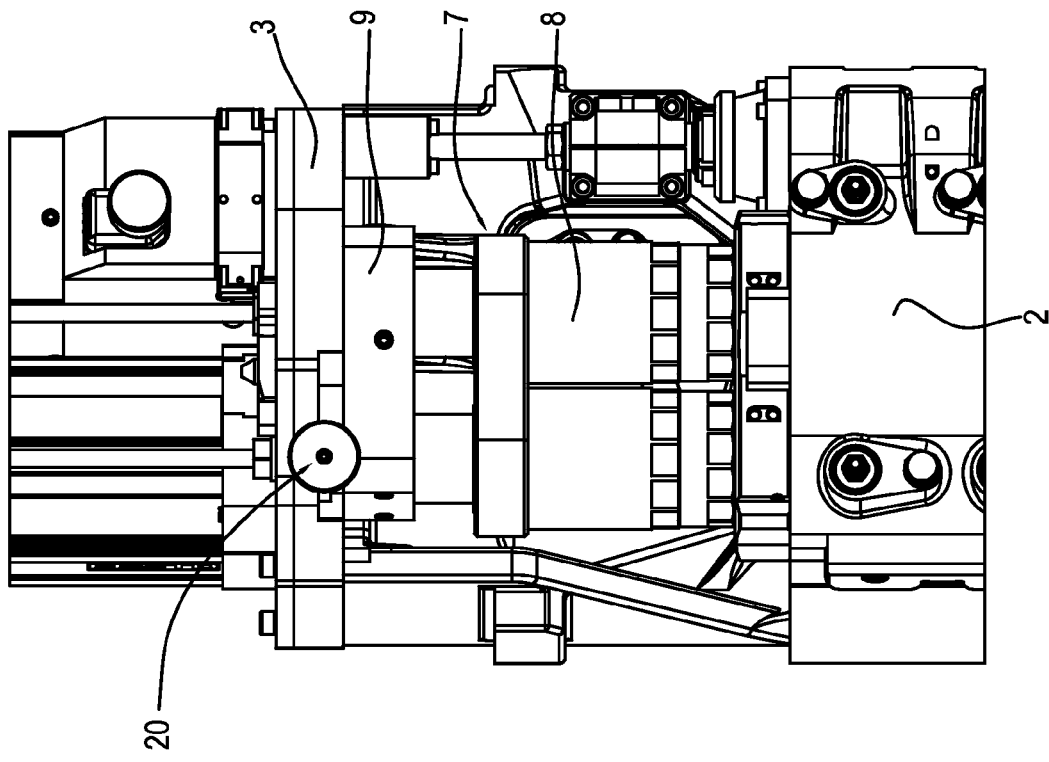
FIG. 2 is a front view showing a portion of the apparatus of FIG. 1 with the blow nozzle in a raised position.
Figure 3:
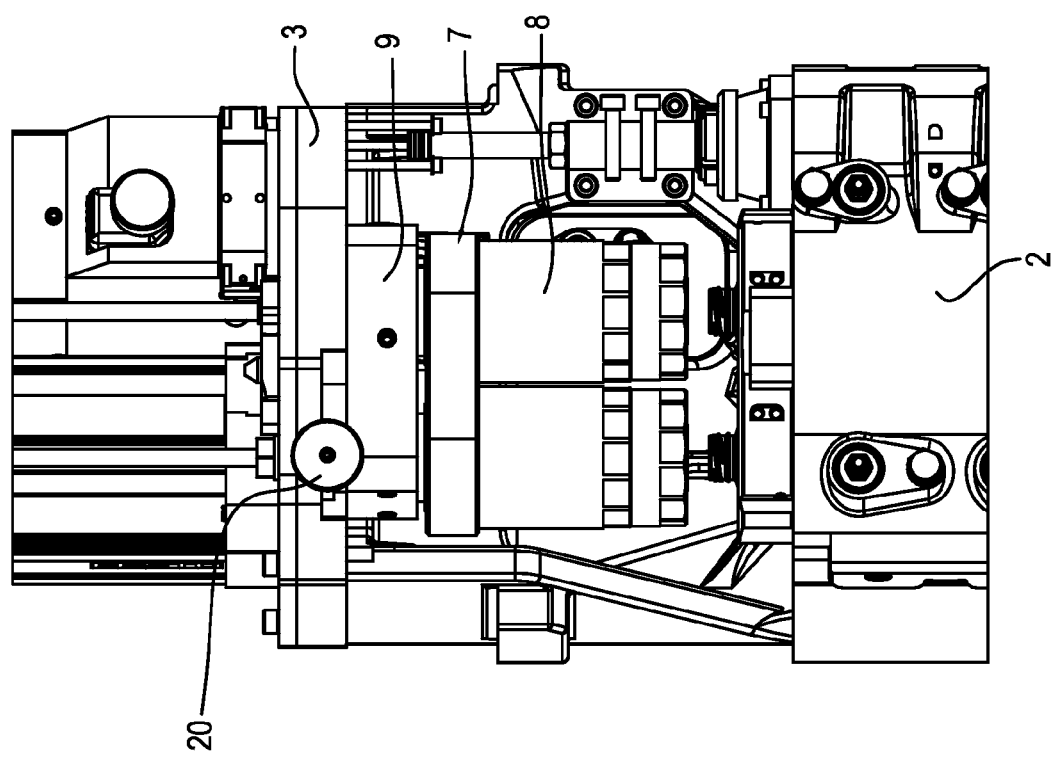
FIG. 3 shows the portion of FIG. 2 with the blow nozzle in a lowered operating position.
Figure 4:
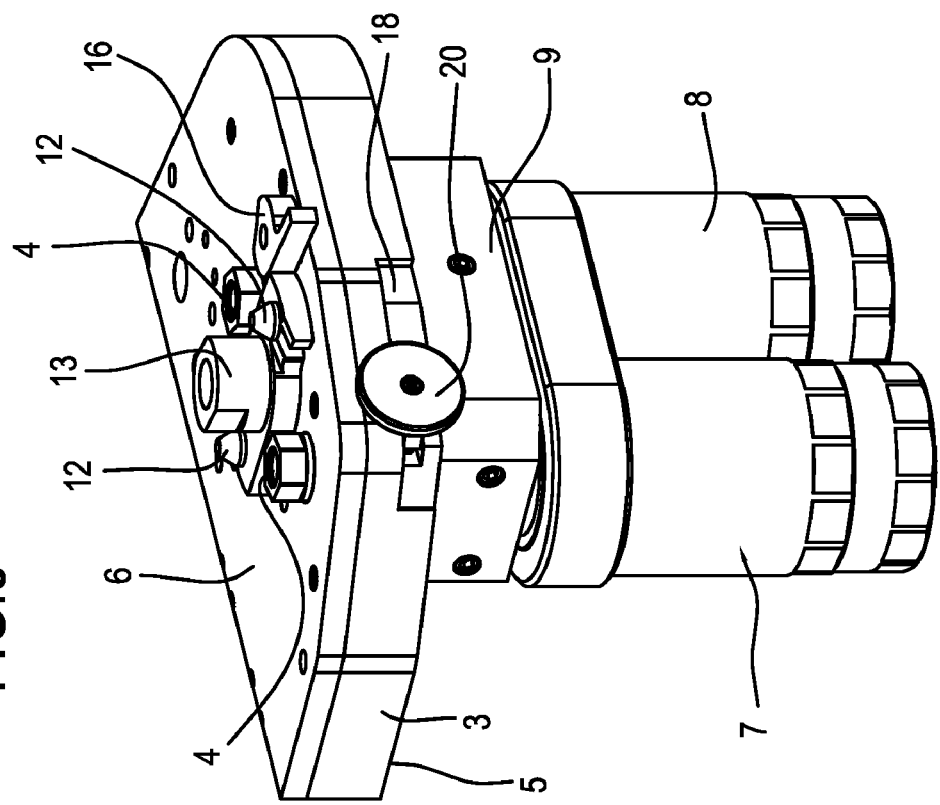
FIG. 4 is a perspective view showing another portion of the apparatus of FIG. 1 with the blow nozzle in an uncoupled position.
Figure 5:
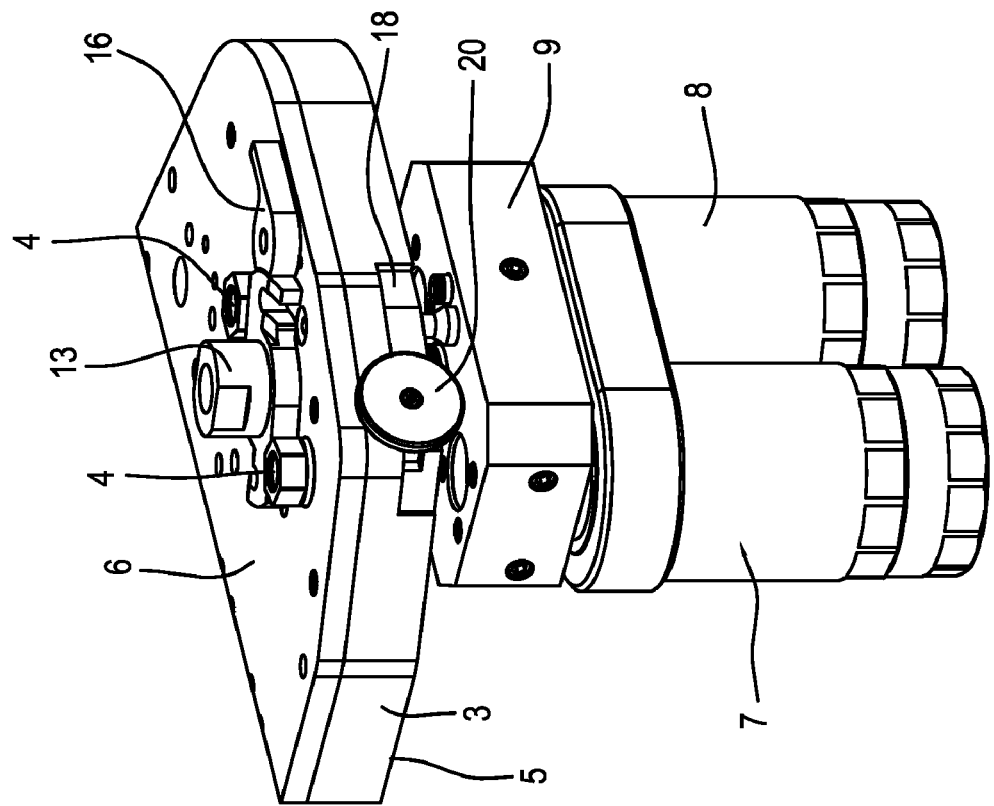
FIG. 5 shows the portion of FIG. 4 with the blow nozzle in a coupled position.
Figure 8:
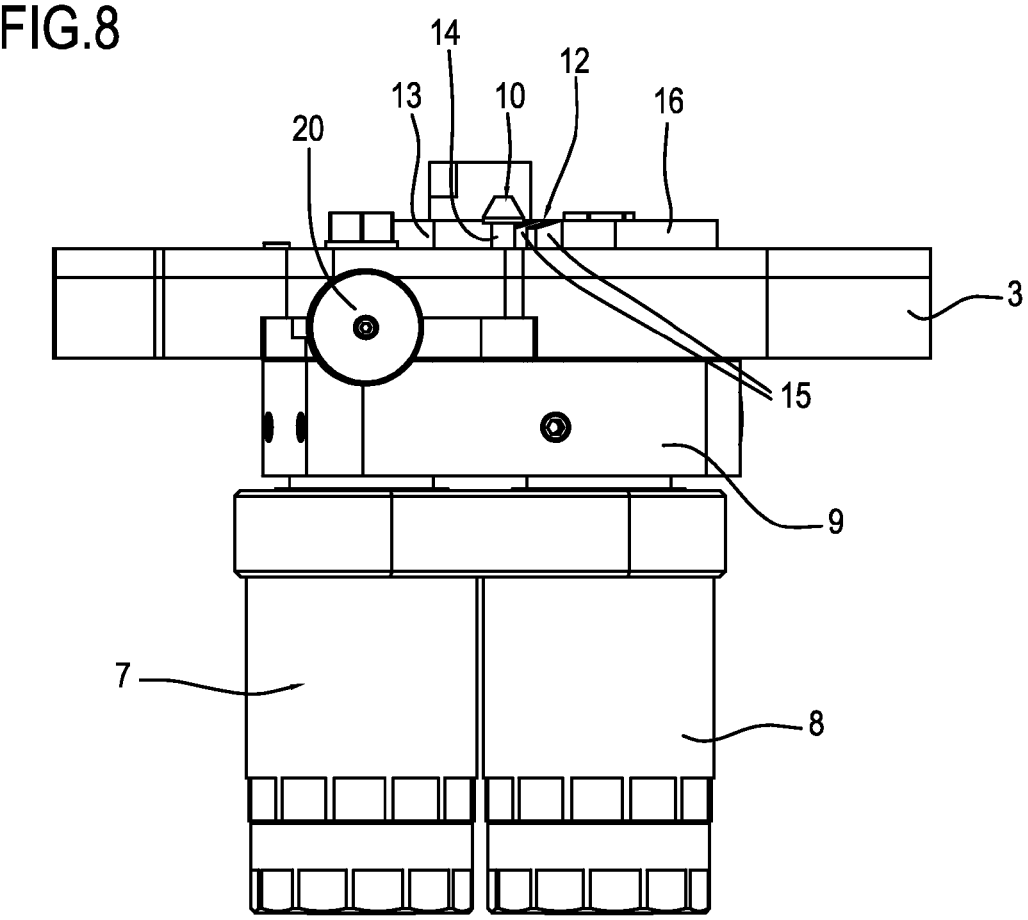
FIG. 8 shows the portion of FIG. 6 with the blow nozzle in a partly coupled position.
Figure 9:
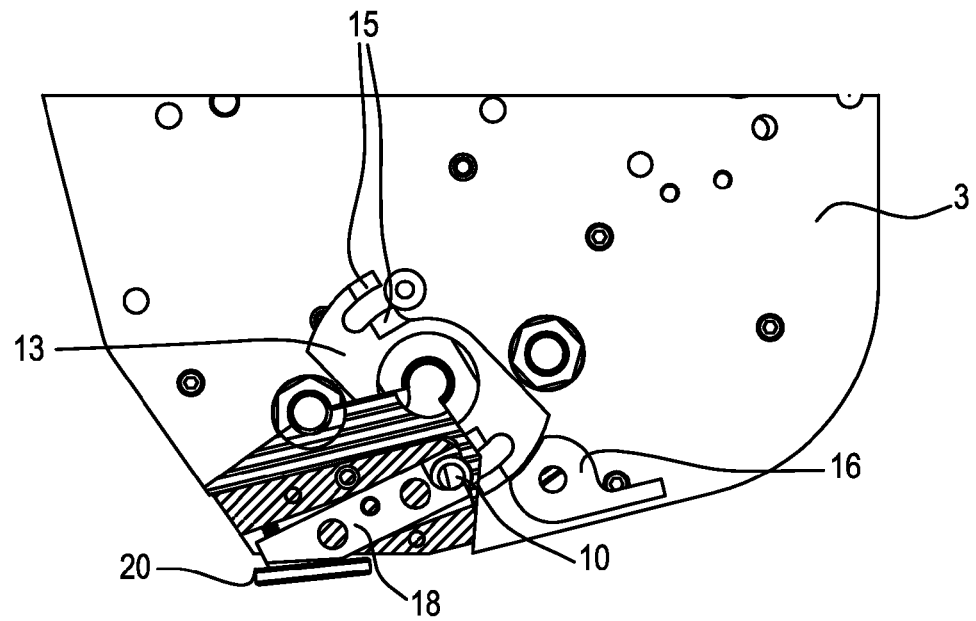
FIG. 9 illustrates the portion of FIG. 8 in a cross section through a horizontal plane.
Figure 10:
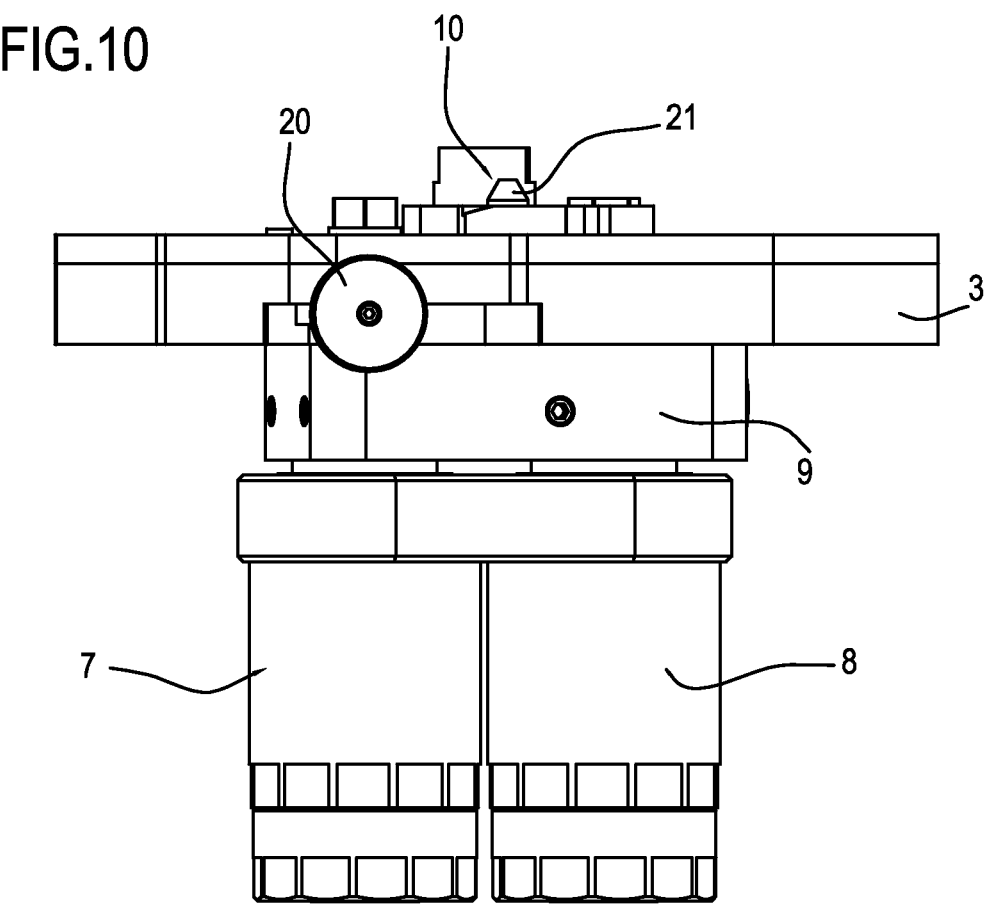
FIG. 10 shows the portion of FIG. 6 with the blow nozzle in a fully coupled position.
Figure 11:
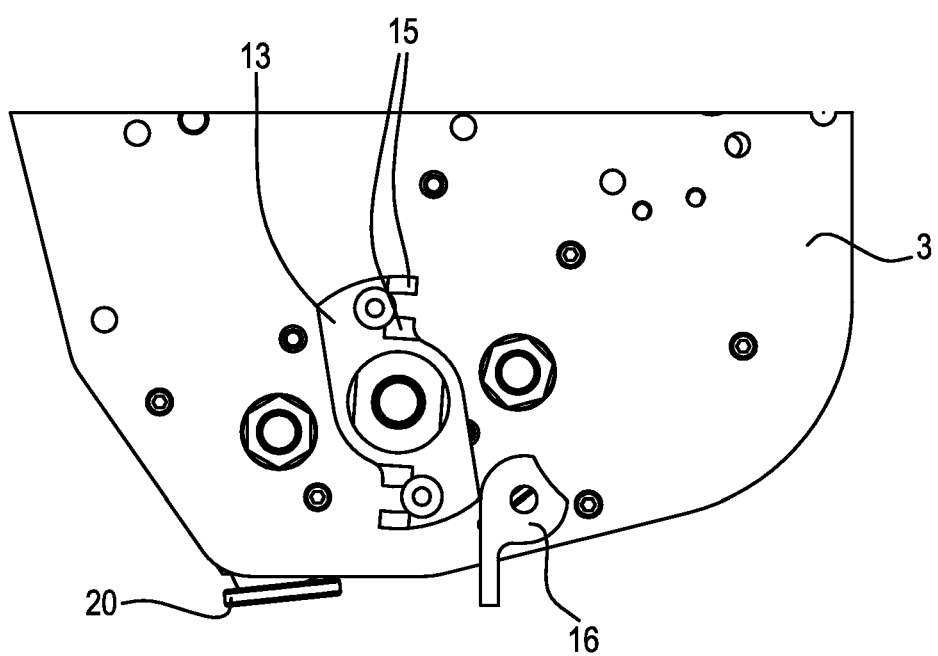
FIG. 11 illustrates the portion of FIG. 10 in a cross section through a horizontal plane.

With reference to the accompanying drawings, the numeral 1 denotes an apparatus according to this invention.

The apparatus comprises a blow-moulding unit for making plastic containers from parisons.

The blow-moulding unit is designed to be installed in a blow-moulding line (not illustrated, being per se known) comprising a blow-moulding machine equipped with a carousel.

The apparatus comprises a mould 2 having at least one moulding cavity (to accommodate the parison and the blow-moulded container, not illustrated since they are per se of known type).

It should be noted that the mould 2 is interchangeable with another mould having a different number of moulding cavities to enable the blow-moulding line it is installed in to make containers of a different size.

The apparatus also comprises a base 3 mounted over the mould 2 and forming at least one passage 4 connected to a high-pressure fluid source.

The base 3 has a bottom face 5, facing the mould 2 and a top face 6, facing upwards.

The apparatus 1 also comprises a blow nozzle 7 forming inside it at least one conduit. The nozzle 7 is connected to the bottom face 5 of the base 3 to be positioned between the base 3 and the mould 2 in such a way that the conduit is in fluid communication with the passage to receive the high-pressure fluid and convey it into the cavity of the mould 2.

It should be noted that the blow nozzle 7 is interchangeable with another blow nozzle 7 having a different number of conduits, equal to the number of moulding cavities in the mould 2.

The blow nozzle 7 comprises a portion 8 that is slidable along a longitudinal (or vertical) axis of the blow nozzle 7 relative to another fixed portion 9.

The movable portion 8 of the blow nozzle 7 is driven towards a top surface of the mould 2 to form a conduit for conveying fluid under pressure into the parison.

According to the invention, the apparatus also comprises at least one pin 10 fixed to a top face 11 of the blow nozzle 7. In particular, the pin 10 protrudes from the top of the blow nozzle 7 to be inserted into a matching through hole (not illustrated) in the base, so that an end portion of it 12 is positioned above the top face 6 of the base 3.

According to the invention, the apparatus also comprises a fastening element 13 connected to the base 3 in such a way as to be movable from an unlocked position, where it does non-interfere with the pin 10, to a locked position where it is inserted in an end groove 14 defined by the end portion 12 of the pin 10, and vice versa.

The pin 10 and the fastening element 13 constitute fastening means for coupling and uncoupling the blow nozzle 7 to and from the base 3.

Preferably, the fastening element 13 has a flat bottom face that is in contact with the top face 6 of the base 3, and a top face with an oblique portion 15 such that the end of the fastening element has the shape of a wedge.

The wedge shaped end of the fastening element 13 is designed to be inserted into the end groove 14 of the pin to lock the blow nozzle 7 against the base by generating a pressure between respective openings (fitted with seals, if necessary) of the passages and conduits of the base 3 and of the blow nozzle 7, respectively, at the interface between the bottom face 5 of the base and the top face 11 of the blow nozzle 7.

Preferably, the fastening element 13 is rotatably coupled to the base 3 to turn from the unlocked to the locked position (and vice versa).

Preferably, the fastening element 13 rotates about an axis that passes through the barycentre of the blow nozzle 7.

Preferably, the fastening means comprise two or more pins 10; in the embodiment illustrated, there are two pins 10.

The pins 10 are preferably positioned symmetrically about an axis passing through the barycentre of the blow nozzle.

Accordingly, the wedge shaped ends of the fastening element 13 are equal in number to the number of pins 10 and are designed to interact with respective end grooves 14 of the pins 10 themselves.

Preferably, the fastening element 13 is shaped in such a way that when it is turned to the locked position, its wedge-shaped ends interact with the pins simultaneously.

The apparatus preferably further comprises a latching member 16 located on the top face 6 of the base 3 and movable on the same between a working position where it prevents the fastening element 13 from moving from the locked position to the unlocked position, and a rest position where it does not interfere with the fastening element 13.

Preferably, the latching member 16 is pivotally attached to the top face 6 of the base 3 and has a protrusion which enables it to be turned easily from the working position to the other position.

The latching member 16 is designed to increase the reliability of the apparatus by preventing the fastening element 13 from being disengaged accidentally.

According to another aspect of this invention, the pin 10 (or at least one of the pins 10 when there is more than one) has an intermediate groove 17 formed in it, which is positioned in such a way that it is inside the base 3 when the latter is coupled to the blow nozzle 7.

The fastening means comprise a catch element 18 fitted in a housing in the base 3 and movable between a locked position where it engages the intermediate groove 17, and an unlocked position where it does not interfere with the pin 10.

There is also a spring 19 connected to the catch element 18 to position the latter in the locked position when there are no other forces applied to it.

A control element 20 is connected to the catch element 18 to move it from locked to the unlocked position against the action of the spring 19.

Preferably the catch element 18 is a lever pivoted to the base 3 and having a first end interacting with the intermediate groove 17 of the pin 10 and a second end connected to a button constituting the control element 20 (in such a way that the button can be operated manually from the outside).

It should be noted that the pin 10 (or each pin 10 if there is more than one) comprises a tapered end portion 21 located at the free end of the pin 10, and a tapered intermediate portion 22 located between the end groove 14 and the intermediate groove 17; these tapered portions are adapted to enable the pin 10 to be inserted into the through hole in the base 3 without having to act on the control element, that is to say they are designed to allow the catch element 18 to be moved into the unlocked position against the action of the spring 19, when the pin 10 is inserted into the base 3.

The pin, on the other hand, is shaped in such a way that the downward movement of the blow nozzle, which causes the pin 10 to be extracted from the respective hole in the base 3, is prevented when the catch element 18 is not operated on by the control element 20 (since the catch element 18 is designed to be inserted in both the intermediate groove 17 and the end groove 14 of the pin).

In use, changeover involves substituting one blow nozzle 7 with another.

Thus, one blow nozzle 7 is uncoupled and another one coupled in its place.

Uncoupling the blow nozzle 7 comprises the following steps:
- moving the latching member 16 into the non-interference position;
- moving the fastening element 13 into the unlocked position;
- operating on the control element 20;
- moving the blow nozzle 7 downwards so as to extract the pins 10 from the respective holes in the base 3 (by holding down the button 20).

Coupling the blow nozzle 7 comprises the following steps:
- moving the blow nozzle 7 upwards so as to insert the pins 10 into the respective holes (the catch element 18 automatically snaps into the groove 17 in the pin 10);
- moving the fastening element 13 into the locked position;
- moving the latching member 16 into the interference position.

It should be noted that before the fastening element 13 is moved into the locked position, the blow nozzle 7 is coupled with the base 3 and is supported by the catch element 18. Then, when the fastening element 13 moves into the locked position, it allows the blow nozzle 7 (thanks also to the oblique profiles of the wedge shaped ends) to be further tightened against the base and to be fastened more securely.

The invention thus also provides a method for coupling and uncoupling a blow nozzle 7 to and from a base 3 in a blow-moulding apparatus 1 for making plastic containers from parisons (the apparatus being an apparatus like the one described above).

According to the invention, the method comprises the following steps:
- inserting, or vice versa, extracting, at least one pin 10, protruding from the top of the blow nozzle 7 into a respective through hole in the base until an end portion 12 of the pin 10 protrudes upwards from a top face 6 of the base 3;

moving a fastening element 13 connected to the base 3 from an unlocked position, where it does not interfere with the pin 10, to a locked position where it is inserted in an end groove 14 defined by the end portion 12 of the pin 10, and vice versa.

Preferably, moving the fastening element 13 from the unlocked to the locked position comprises inserting a wedge-shaped end of the fastening element into the end groove.

Moving the fastening element 13 from the unlocked to the locked position also comprises turning the fastening element about an axis perpendicular to a plane defined by the top face of the base 3.

There is also, between the step of inserting and the step of moving, a further step of coupling or, vice versa, uncoupling a catch element 18 (located in a housing in the base 3) with respect to an intermediate groove 17 formed on the pin 10 in such a way as to be positioned inside the base 3 when the blow nozzle 7 is coupled to it.

The catch element 18 preferably snaps into the intermediate groove on the pin under the action of a spring 19.

The advantages of the invention lie in the fact that changeover is made extremely quick and easy.

What is claimed is:

1. An apparatus (1) for making plastic containers by blow-moulding parisons comprising:
    a mould (2) having at least one moulding cavity;
    a base (3) mounted over the mould (2), forming at least one passage (4) connected to a high-pressure fluid source;
    a blow nozzle (7) forming at least one conduit and connected to a bottom face (5) of the base (3) to be positioned between the base (3) and the mould (2) in such a way that the conduit is in fluid communication with the passage (4) to receive the high-pressure fluid and convey it into the moulding cavity;
    fastening means for coupling and uncoupling the nozzle (7) to and from the base (3),
wherein the fastening means comprise, in combination:
    at least one pin (10), protruding from the top of the blow nozzle (7) to be inserted into a respective through hole in the base (3) until an end portion (12) of it protrudes upwards from a top face (6) of the base (3);
    a fastening element (13) connected to the base (3) in such a way as to be movable from an unlocked position, where it does not interfere with the pin (10), to a locked position, where it is inserted in an end groove (14) defined by the end portion (12) of the pin (10), and vice versa.

2. The apparatus according to claim 1, wherein the fastening element (13) has a flat bottom face that is in contact with the top face (6) of the base, and a top face with an oblique portion (15), such that the end of the fastening element (13) has the shape of a wedge.

3. The apparatus according to claim 1, wherein the fastening element (13) is rotatably coupled to the base (3) to turn between the unlocked and the locked position.

4. The apparatus according to claim 3, wherein the fastening means comprise two or more pins (10) positioned symmetrically about an axis of rotation of the fastening element (13) passing through the barycentre of the blow nozzle (7), the wedge shaped ends of the fastening element (13) being equal in number to the number of pins (10) and being designed to interact with respective end grooves (14) of the pins (10) themselves.

5. The apparatus according to claim 4, comprising a latching member (16) located on the top face (6) of the base (3) and movable on the same between a working position, where it prevents the fastening element (13) from moving from the locked position to the unlocked position, and a rest position, where it does not interfere with the fastening element (13).

6. The apparatus according to claim 1, wherein:
    the at least one pin (10) has an intermediate groove (17) formed in it, which is positioned in such a way that it is inside the base (3) when the latter is coupled to the blow nozzle (7);
    the fastening means comprise a catch element (18) fitted in a housing in the base (3) and movable between a locked position, where it engages the intermediate groove (17), and an unlocked position, where it does not interfere with the pin (10).

7. The apparatus according to claim 6, wherein the fastening means comprise:
    a spring (19) connected to the catch element (18) to position the latter in the locked position when there are no other forces applied to it;
    a control element (20) connected to the catch element (18) to move it from the locked to the unlocked position against the action of the spring (19).

8. The apparatus according to claim 7, wherein the catch element (18) is a lever pivoted to the base (3) and having a first end interacting with the intermediate groove (17) of the pin (10) and a second end connected to a button constituting the control element (20).

9. The apparatus according to claim 6, wherein the pin (10) comprises a tapered end portion (21) and a tapered intermediate portion (22) located between the end groove (14) and the intermediate groove (17) to enable the pin (10) to be inserted into the through hole in the base (3) without having to act on the control element (20).

10. A method for coupling and uncoupling a blow nozzle (7) to and from a base (3) in a blow-moulding apparatus (1) for making plastic containers from parisons, comprising:
    a mould (2) having at least one moulding cavity;
    the base (3) mounted over the mould, forming at least one passage (4) connected to a high-pressure fluid source;
    the blow nozzle (7) forming at least one conduit and connected to a bottom face (5) of the base (3) to be positioned between the base (3) and the mould (2) in such a way that the conduit is in fluid communication with the passage (4) to receive the high-pressure fluid and convey it into the moulding cavity;
    fastening means for coupling and uncoupling the nozzle (7) to and from the base (3);
    inserting, or vice versa extracting, at least one pin (10), protruding from the top of the blow nozzle (7), into a respective through hole in the base (3) until an end portion (12) of the pin (10) protrudes upwards from a top face (6) of the base (3);
    moving a fastening element (13) connected to the base (3) from an unlocked position, where it does not interfere with the pin (10), to a locked position, where it is inserted in an end groove (14) defined by the end portion (12) of the pin (10), or vice versa.

11. The method according to claim 10, wherein moving the fastening element (13) from the unlocked to the locked position comprises inserting a wedge-shaped end of the fastening element (13) into the end groove (14).

12. The method according to claim 11, wherein moving the fastening element (13) from the unlocked to the locked position comprises turning the fastening element (13) about an axis perpendicular to a plane defined by the top face (6) of the base (3).

13. The method according to claim 10, comprising, between the step of inserting and the step of moving, a further step of coupling or, vice versa, uncoupling a catch element (18), located in a housing in the base (3), with respect to an intermediate groove (17) formed on the pin (10) in such a way as to be positioned inside the base (3) when the blow nozzle (7) is coupled to it.

14. The method according to claim 13, wherein the catch element (18) snaps into the intermediate groove (17) on the pin (10) under the action of a spring (19).

* * * * *